No. 871,867. PATENTED NOV. 26, 1907.
W. GALLOWAY.
MANURE SPREADER.
APPLICATION FILED FEB. 23, 1907.
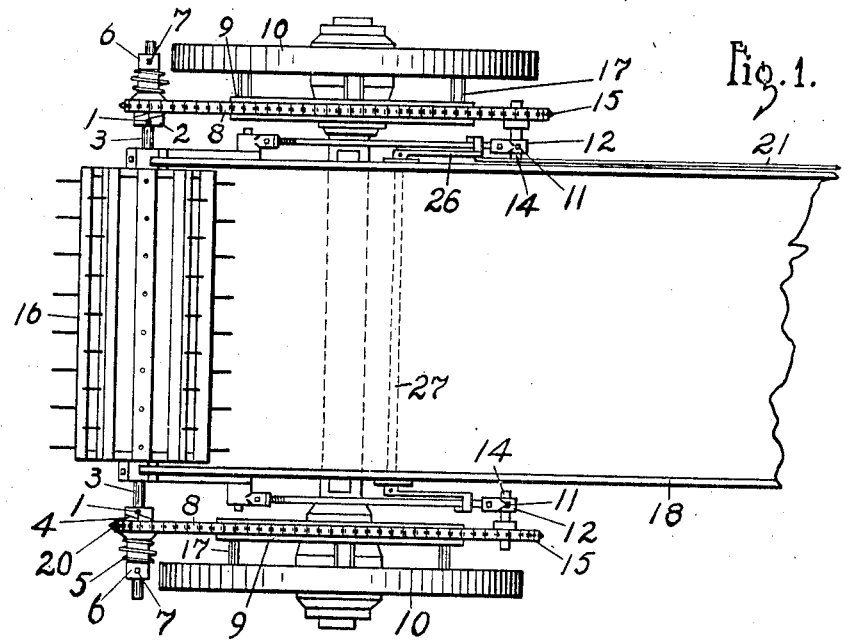
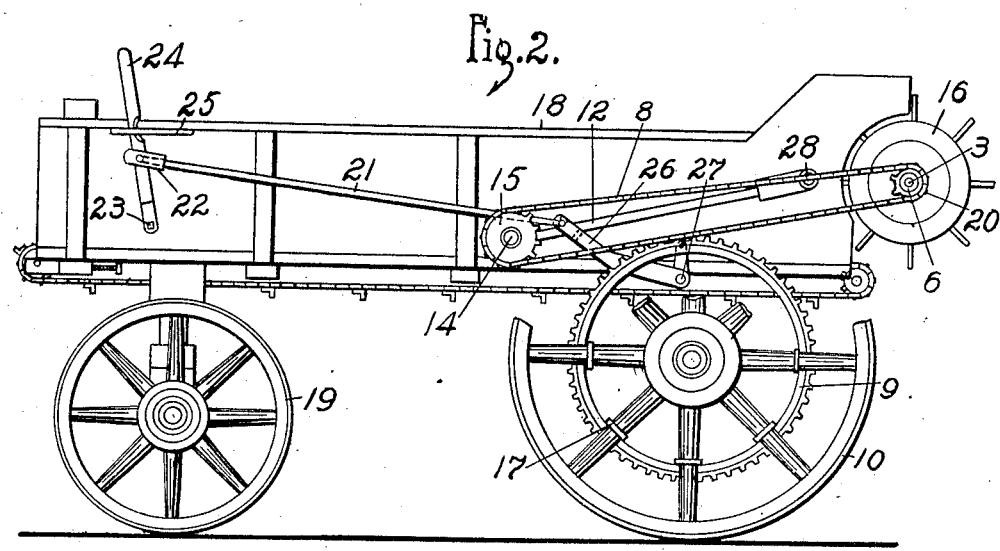
WITNESSES:
H. M. Harper
O. D. Young
INVENTOR
William Galloway.
BY
G. C. Kennedy
ATTORNEY

UNITED STATES PATENT OFFICE.

WILLIAM GALLOWAY, OF WATERLOO, IOWA, ASSIGNOR TO WILLIAM GALLOWAY COMPANY, OF WATERLOO, IOWA.

MANURE-SPREADER.

No. 871,867.　　　　Specification of Letters Patent.　　　　Patented Nov. 26, 1907.

Application filed February 23, 1907. Serial No. 359,023.

*To all whom it may concern:*

Be it known that I, WILLIAM GALLOWAY, a citizen of the United States of America, and a resident of Waterloo, Blackhawk county, Iowa, have invented certain new and useful Improvements in Manure-Spreaders, of which the following is a specification.

My invention relates to improvements in manure spreaders, and the object of my improvement is to provide means for adjusting the sprocket chains which drive the beater drum so that they may be used on the driving sprocket wheels affixed to the wagon wheels of the spreader, such adjustment being in the spacing apart to accommodate different running-gears of greater or less widths apart. This object I have accomplished by the means which are hereinafter described and claimed, and which are illustrated in the accompanying drawing, in which—

Figure 1 is a plan view of a manure-spreader equipped with my improved adjustable spacing means, and Fig. 2 is a side elevation of the same.

My invention is devised to be incorporated in the mechanism of a detachable spreader arranged to be superposed upon the running gear of any ordinary wagon. Inasmuch as the width between wagon wheels vary, it is necessary to devise some means for adjusting the spacing apart horizontally of the sprocket chains so that they may properly engage the driving sprocket wheels affixed to the inner sides of the rear driving wheels of the wagon. In the drawing I have shown a spreader box 18 supported upon the running gear of an ordinary wagon. The rear wheels of the wagon 10 have the large driving sprocket wheels 9 attached to their inner sides by means of the bracket connections 17. The driving sprocket chains 8 which engage said sprocket wheels 9 also actuate the smaller forward sprocket wheels 15 and rear sprocket wheels 20. The hubs of the rear sprocket wheels 20 which are rotatably mounted on the shaft 3 of the beater drum 16, are provided with teeth 4 on their inner sides adapted to engage teeth on the outer faces of the collars 2. The collars 2 are mounted on the shaft 3 so as to slide thereon for adjustment but when properly adjusted to be secured to said shaft by means of set-screws 1. Collars 6 are slidably mounted on the outer ends of the shaft 3 and are provided with set-screws 7 whereby they may be fixed in any position in which they are adjusted. The hubs of the sprocket wheels 20 are horizontally slidable but their teeth 4 are ordinarily kept in engagement with the teeth on the collars 2 by means of the springs 5 interposed between said hubs and the collars 6. The forward sprocket wheels 15 are rotatably mounted on the outer portions of the short shafts 14, the inner ends of said shafts being affixed within vertically adjustable levers 12 pivoted to studs 28 on the box 18 by means of set-screws 11. The short shafts 14 are longitudinally slidable within bearings in the ends of the levers 12 and when properly adjusted are affixed thereto by means of the set-screws 11.

The levers 12 are raised and lowered by means of the levers 26 whose rear ends are secured to a rock-shaft 27, the levers 12 being passed through loops on the forward ends of said levers 26. To a stud 23 on one side of the box 18 the lower end of a hand-lever 24 is fulcrumed, said lever working in and adapted to engage a rack 25 for forward and back positions. At a medial place on the lever 24 is pivoted an interiorly threaded coupling 22 into which is adjustably screwed the threaded front end of a connecting-rod 21, whose rear end is pivoted to the forward end of one of the levers 26, and by which means the levers 26 are raised or lowered at will to cause the levers 12 to rise or fall and the sprocket-chains 8 to be in disengagement or engagement as the case may be with the driving sprocket-wheels 9.

When the spreader box 18 has been placed upon the bolsters of the running gear of an ordinary wagon having front wheels 19 and rear wheels 10, in case the rear wheels 10 are more widely separated than usual the sprocket chains 8 may be adjusted to engage the sprocket wheels 9 attached to the wheels 10 in the following manner. The set-screws 1 and 7 also the set-screws 11 are loosened and the collars 2 and 6 moved outwardly on the shaft 3, while the short shaft 14 is itself moved outwardly, all to a sufficient distance to permit of the sprocket chains 8 engaging the sprocket wheels 9. All of said set-screws are then secured against said shafts leaving the mechanism in operative position. In case the spreader mechanism above described is placed upon the bolsters of the running gear of a wagon whose wheels are spaced a lesser distance apart than the above, the sprocket chains 8 are moved a sufficient distance inwardly by reversing the above process. By these means I have been enabled to secure operative engagement of the sprocket chains with the driving sprocket wheels attached to the rear wheels of any running gear however variously spaced apart.

Having described my invention, what I claim as new, and desire to secure by Letters Patent, is—

1. In a manure-spreader, the combination with a body supported on carrying-wheels having driving-sprocket-wheels secured to their inner faces, of a shaft rotatably mounted transversely to said body, a horizontally-adjustable sprocket-wheel secured to each end of said shaft, a horizontally-adjustable idler-sprocket-wheel rotatably mounted on a stub-shaft on each side of said body, a sprocket-chain on each side of said body passing about the idler- and the driven-sprocket-wheel on the same side, each of said sprocket-chains being adapted to engage and be driven by the driving-sprocket-wheel on the same side.

2. In a manure spreader, the combination with a body supported on carrying-wheels, of a beater-drum mounted on a shaft at one end of said body, horizontally-slidable sprocket-wheels on said shaft, means for adjusting and securing said sprocket-wheels a desired distance apart, sprocket-wheels on the rear carrying-wheels affixed thereto, sprocket-chains engaging both the driving- and driven-sprocket-wheels aforesaid, and means for adjusting the forward ends of said sprocket-chains to a desired distance apart.

3. In a manure spreader, the combination with a body supported on carrying-wheels having driving-sprockets affixed to their inner faces, of a vertically-adjustable idler-sprocket-carrying lever pivoted on each side of said body, a short shaft horizontally slidable in a bearing in the free end of each lever, means for fixing each shaft in a desired position of horizontal adjustment in the bearing in each lever, an idler-sprocket-wheel rotatable on each shaft, driven sprocket-wheels, a sprocket-chain on each side of said body passing about said idler and one of the driven sprocket-wheels, and means for elevating or lowering said idler-carrying-levers to disengage or engage said sprocket-chains from or with said driving-sprocket-wheels.

4. In a manure spreader, the combination with a body supported on carrying-wheels having driving-sprockets affixed to their inner faces, of a vertically-adjustable idler-sprocket-carrying-lever pivoted on each side of said body, a short shaft horizontally slidable in a bearing in the free end of each lever, means for fixing each shaft in a desired position of horizontal adjustment in the bearing in each lever, an idler-sprocket-wheel rotatable on each shaft, driven sprocket-wheels, a sprocket-chain on each side of said body passing about said idler and one of the driven-sprocket-wheels on that side, a rock-shaft mounted transversely to said body, a shifting-lever secured to each end of said rock-shaft, each shifting-lever being slidably connected to said idler-carrying-lever on the same side, a hand-lever pivoted to said body, a rack-bar on said body adapted to secure said hand-lever in either a desired forward or back position of adjustment, and a connecting-rod pivoted to said hand-lever and to the shifting-lever on the same side of the body.

Signed at Waterloo, Iowa, this 10th day of Jan., 1907.

WILLIAM GALLOWAY.

Witnesses:
O. D. YOUNG,
G. C. KENNEDY.